UNITED STATES PATENT OFFICE.

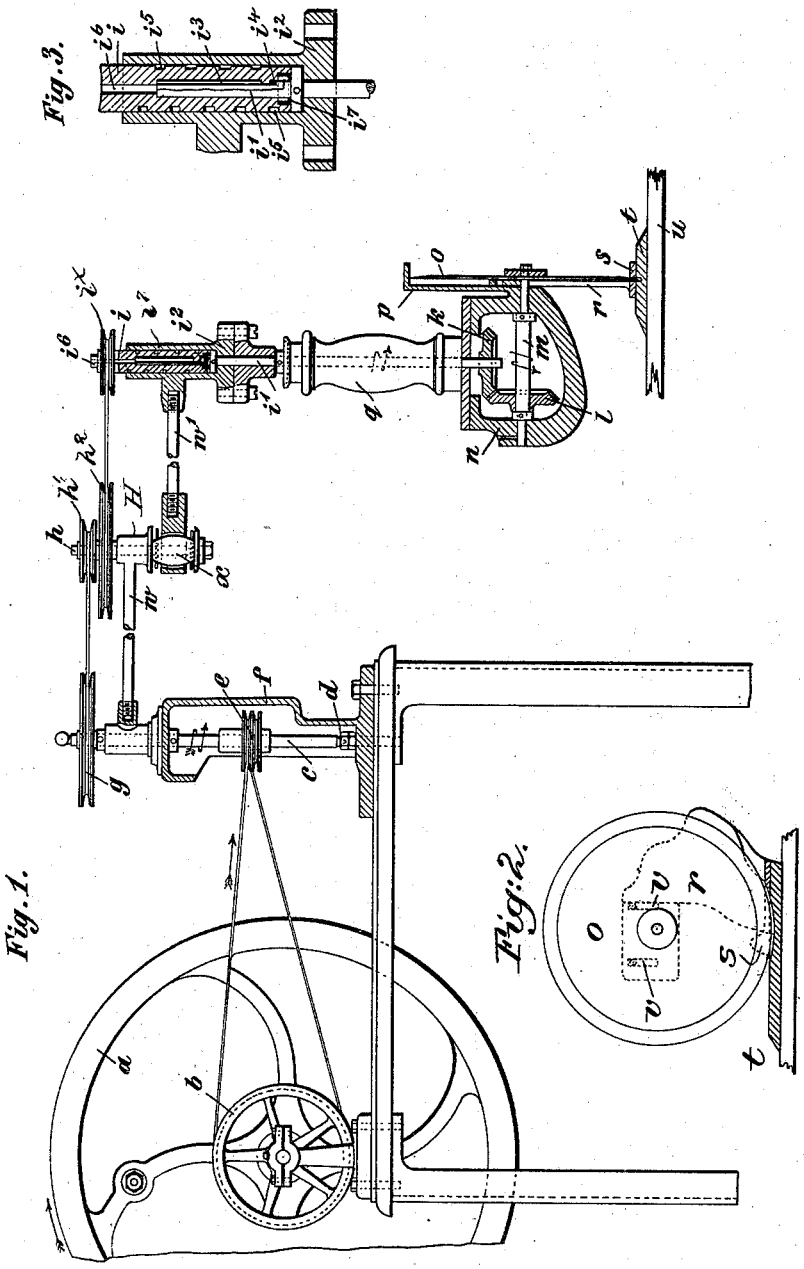

HERMANN NACK, OF BERLIN, GERMANY.

MACHINE FOR CUTTING CLOTH.

SPECIFICATION forming part of Letters Patent No. 558,831, dated April 21, 1896.

Application filed December 2, 1893. Serial No. 492,608. (No model.) Patented in England November 14, 1893, No. 21,758; in Austria-Hungary November 17, 1893, No. 21,097 and No. 85,723; in France November 18, 1893, No. 234,157, and in Belgium November 18, 1893, No. 107,215.

*To all whom it may concern:*

Be it known that I, HERMANN NACK, engineer, of 31 and 32 Mariannenstrasse, Berlin, in the Empire of Germany, have invented new and useful Improvements in Machines for Cutting Out Cloth, (for which I have secured patents in Austria-Hungary, No. 21,097 and No. 85,723, dated November 17, 1893; in England, No. 21,758, dated November 14, 1893; in France, No. 234,157, dated November 18, 1893, and in Belgium, No. 107,215, dated November 18, 1893,) of which the following is a specification, reference being had therein to the accompanying drawings.

This invention has for its object to produce a machine in which the cutter, carried by one or more horizontally-swinging arms, may be lifted above the work at one point and brought down at another point or swung aside out of the way of the work without in any way disturbing the layers. The machine is portable and compact and may be arranged to operate in any convenient position.

Reference is to be had to the accompanying drawings, forming part of this specification, wherein—

Figure 1 shows the machine in elevation and partly in section. Fig. 2 is a face view of the cutting device; and Fig. 3 a vertical section, on a larger scale, through the shaft and bearing.

The cutter is driven from a fly-wheel $a$, operated by hand or power through a pulley $b$ fast therewith, a belt running thereon and on a pulley $e$, fast on a vertical shaft $c$, mounted in a bearing $d$. (Herein shown as fixed and in a protecting-casing.) A pulley $g$, fast on the shaft $c$, is belted to a pulley $h'$ on a spindle $h$, journaled in the head H on the end of the swinging arm $w$, mounted to swing about the axis coincident with the axis of the vertical shaft $c$. The spindle $h$ has fast upon it another pulley $h^2$, belted to a pulley $i^\times$ on a spindle $i$, journaled in a head $i^7$ on the outer end of an arm $w'$, mounted to swing about and carried by the head H. The spindle $i$ is axially connected to the spindle $i'$, also journaled in said head $i^7$ and carrying a bevel-gear $k$, driving a bevel-gear $l$ on the spindle $m$ of the circular or disk cutter $o$, which latter should be speeded to run at about one thousand revolutions per minute. The shaft $m$ is journaled in the casing $n$, inclosing the bevel-gears referred to. The cutter $o$ is secured on the projecting end of the shaft $m$ in such suitable manner that it can be readily dismounted and replaced by another cutter ground to suit the work.

The cutter $o$ is shielded at the top by a guard-plate $p$, cast with or fixed to the casing $n$ to protect the hand of the operator when grasping the handle $q$ for directing the cutter. An adjustable bracket $r$ is fixed to the casing $n$ and carries the slotted foot $s$ and shoe $t$, which is grooved to clear the cutter-edge, said shoe at its front end being beveled abruptly, so that the layers of cloth lying upon the table $u$ when raised thereby to meet the cutter are directed edgewise against the same at the moment of cutting, with the result that the material is not drawn into the slots, but is easily cut through, thus permitting the continuous operation of the cutter. When the radius of the cutter has become diminished by repeated grinding, the shoe $t$ can be set accordingly by means of the bolts and slots $v$. The radius or swing arms $w\,w'$ permit swinging of the cutter in any required direction in a horizontal plane, and in accordance with my invention the joint $x$, by which the radius-arms are connected together, is in the form of a ball and socket to admit of substantially vertical motion of the arm $w'$ to enable the cutter to be raised directly up from the table and work thereupon in any position.

The short shaft $i$, as shown, is tubular and receives the spindle $i'$, with which it has a sliding connection, formed by a feather $i^4$ on one engaging in a longitudinal groove in the other, so that the two slide freely for vertical motion when the cutter is raised or lowered. The short shaft $i$ has an exterior spiral groove $i^5$, whereby the oil supplied at $i^6$ and collecting in a cup at $i^{7\times}$ is carried upward by the rotation of the shaft, thus keeping the bearing lubricated.

What I claim, and desire to secure by Letters Patent of the United States, is—

1. A machine for cutting cloth, containing a substantially vertical driving-shaft, as c, a rotary cutter and its spindle, driven therefrom, and one or more substantially horizontal arms connecting said cutter with said shaft, said shaft, arm, or arms being jointed one to another to enable said arm or arms and cutter to be swung about said shaft, one of said joints being a ball-and-socket joint, whereby the connected arm or arms of said socket-joint may be swung not only in a horizontal plane but raised from the table, without changing its location thereon, substantially as described.

2. In a machine of the class described, the combination with one or more swinging arms, means for supporting the same, a head at the outer end of said arms, a spindle therein, and means to rotate the same; a rotary cutter carried by said head, and its spindle connected with and having a sliding motion relatively to the said first-named spindle, substantially as described.

3. A machine for cutting cloth, containing a substantially vertical driving-shaft, as c, a rotary cutter and its spindle, driven therefrom, and two or more substantially horizontal arms connecting said cutter with said shaft, said arms being jointed to enable the cutter to be freely swung horizontally in any direction, one of said joints being a universal joint whereby its connected arm or arms and cutter may be swung not only in a horizontal plane but raised from the table without changing its relative location thereon, substantially as described.

4. A machine for cutting cloth containing a substantially vertical driving-shaft, a rotary cutter and its spindle, an intermediate spindle substantially parallel with said shaft, driving connections between said shaft and parallel spindle, and two or more arms, connecting said cutter with said shaft, said arms being jointed to enable the cutter to be freely swung horizontally in any direction, one of said joints being a universal joint whereby its connecting arm or arms and cutter may be swung not only in a horizontal plane but raised from the table without changing its relative location thereon, substantially as described.

HERMANN NACK.

Witnesses:
PAUL FISCHER,
JOHN B. JACKSON.